US006883221B1

(12) United States Patent
Hayes, III

(10) Patent No.: US 6,883,221 B1
(45) Date of Patent: Apr. 26, 2005

(54) PIN REMOVAL AND PLACEMENT TOOL

(76) Inventor: Edward P. Hayes, III, 440 Buttonball La., Glastonbury, CT (US) 06033

(*) Notice: Subject to any disclaimer, the term of this patent is extended or adjusted under 35 U.S.C. 154(b) by 0 days.

(21) Appl. No.: 10/057,049

(22) Filed: Jan. 24, 2002

Related U.S. Application Data

(63) Continuation-in-part of application No. 09/619,284, filed on Jul. 19, 2000, now abandoned.

(51) Int. Cl.[7] .......................... B23P 19/02; B23P 19/04; B25B 27/02

(52) U.S. Cl. .......................... 29/426.5; 29/525; 29/253; 29/255; 29/275; 29/280; 29/283; 81/44; 81/463; 81/489; 81/53.2; 81/184; 81/439

(58) Field of Search .......................... 29/275, 276, 253, 29/255, 280, 283, 426.5, 525; 81/44, 463, 489, 490, 52.2, 439, 184

(56) References Cited

U.S. PATENT DOCUMENTS 1,120,947 A * 12/1914 Langager
3,689,977 A * 9/1972 Crabbe
3,783,492 A * 1/1974 Duckett et al.
3,999,275 A * 12/1976 Schmidt
4,240,771 A * 12/1980 Derbyshire
D290,399 S * 6/1987 Kitchens
5,012,567 A * 5/1991 Hill
5,058,257 A * 10/1991 Freestone et al.

* cited by examiner

*Primary Examiner*—Eric Compton
(74) *Attorney, Agent, or Firm*—Cantor Colburn LLP

(57) ABSTRACT

A pin removal and placement tool (50) has a body member (52) made of plate steel having a contact surface (52*b*) and a rear edge (52*c*). Tool (50) also may have an anvil plate (54) mounted on a striking plate (56), a drive shaft (58), and a handle (70) projecting at a right angle from the body member (52). The striking plate (56) is fixedly mounted to the rear edge (52*c*) and anvil plate (54) is disposed at a selected angle to the drive shaft (58) to enhance the striking force of drive shaft (58) and to reduce the length of the tool (50) so as to facilitate its insertion between the teeth of buckets, etc. A shoe (62) may be mounted on tool (5) to adjust the clearance between contact surface (52*b*) and drive shaft (58). The handle (70) may be either removably or fixedly attached to the body member (52) and be dimensioned and mounted to selectively project from a selected side thereof, or from both sides thereof.

23 Claims, 12 Drawing Sheets

PRIOR ART

FIG. 9A
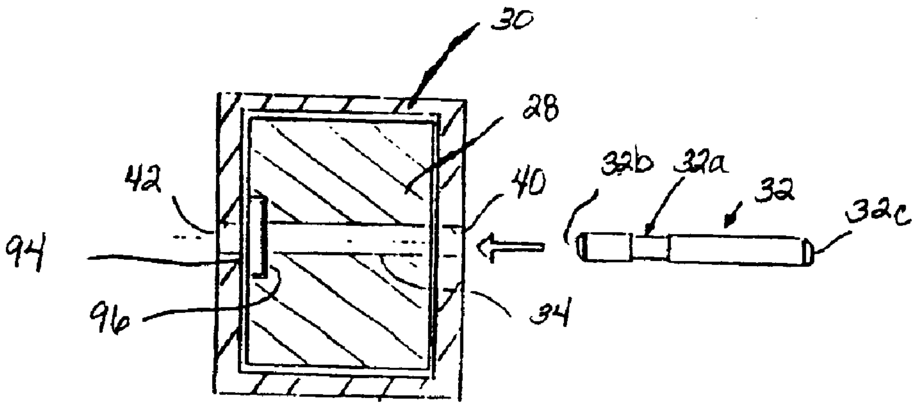
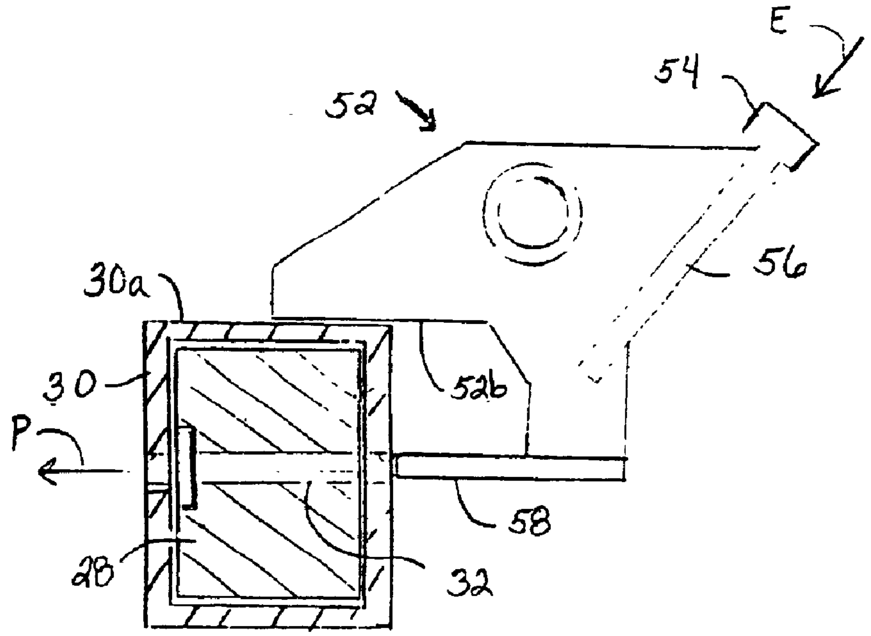
FIG. 9B

PIN REMOVAL AND PLACEMENT TOOL

CROSS-REFERENCE TO RELATED APPLICATION

This application is a continuation-in-part of U.S. application Ser. No. 09/619,284, filed Jul. 19, 2000, now abandoned.

BACKGROUND OF THE INVENTION

1. Field of the Invention

The present invention relates to a tool for use in removing and attaching teeth to toothed articles such as the toothed blades, toothed buckets and the like of earth-moving or other equipment. Such blades and buckets have a plurality of removable teeth or caps attached by means of pins to shanks extending from the edge of such blades and buckets. The shanks and removable teeth each have formed therein pin-receiving bores which are aligned with each other when the tooth or cap is properly positioned on the shank.

2. Related Art

U.S. Pat. No. 5,058,257, issued Oct. 22, 1991 to Freestone et al and entitled "Tool For Inserting And Removing Pin For Bucket Tooth", discloses a tool for removing conventional flex pins from the shanks of equipment blades and buckets. This tool is currently commercially available under the trademark PIN-MASTER.

SUMMARY OF THE INVENTION

Generally, the present invention provides a pin removal and placement tool for use in removing and placing retaining pins of the type used to hold caps on shanks in the cap/shank combination providing, for example, the teeth on buckets and/or blades of construction equipment and the like, and to methods for use of the tool.

Specifically, in accordance with the present invention, there is provided a pin removal and placement tool comprising a body member and a drive shaft extending from the body member. The drive shaft has a longitudinal axis and a distal end which terminates at a tip. The tool further comprises a sole striking surface on the body member, the striking surface having a striking axis perpendicular thereto that intersects the longitudinal axis of the drive shaft at an acute angle $\theta$. The sole striking surface faces away from the tip of the drive shaft whereby a blow struck against the striking surface will urge the drive shaft in the direction the tip is facing. There is also a handle on the body member, the handle extending transversely from a plane defined by the longitudinal axis of the drive shaft and the striking axis of the striking surface.

In one aspect of the invention, the tool may further comprise an anvil plate on the body member; the anvil plate defining the striking surface.

In another aspect of the invention, the body member may define a contact surface that extends in generally parallel relation to the longitudinal axis of the drive shaft.

According to one aspect of this invention, the body member may have a rear edge and may comprise a striking plate fixedly mounted along the rear edge and at right angles thereto. The anvil plate may be mounted on the striking plate at right angles to the striking plate and to the body member. In a related aspect, the striking plate may have a tapered configuration including a base and an opposite, narrow end. The base may be situated at the upper rear portion of the body member and the narrow end may be situated at the lower rear portion. The anvil plate may be centered on the base of the striking plate. In a particular embodiment, the narrow end of the striking plate may have a slot therein forming two legs. The slot may have a width of about the thickness of the body member, and an edge of the body member may be received within the legs of the narrow end. Optionally, the striking plate and anvil plate may be integrally formed with the body member.

According to another aspect of this invention, the handle may be removably attached to the body member, and is dimensioned and configured to be mounted on the tool to extend from either side of the body member. Alternatively, the handle may be fixedly mounted to the body member, and may extend from both sides of the body member.

In yet another aspect, the tool may further include an adaptor sleeve that is dimensioned and configured to be slidably mounted on the drive shaft to extend beyond the drive shaft and to receive a retaining pin therein.

According to yet another aspect of the invention, the angle $\theta$ may be approximately 40 to 60 degrees from the longitudinal axis of the drive shaft. For example, the angle $\theta$ may be about 45±5 degrees.

One aspect of the present invention provides that the tool may further comprise a shoe providing a shim plate between the contact edge and the drive shaft. The shoe may be removably secured to the body member.

In accordance with one method aspect of the present invention, there is provided a method of removing a retaining pin from a first object and a second object having aligned holes through which the retaining pin extends to secure the objects together. The retaining pin is removed by utilizing a tool as described above by: (a) gripping the handle of the tool with one hand of the user, (b) aligning the tip of the drive shaft of the tool with one end of the retaining pin; and (c) striking the striking surface with a hammer held in the user's other hand one or more times as required to drive the retaining pin from the aligned holes sufficiently to separate the two objects.

Another method aspect of the present invention provides for utilizing a tool wherein the handle is removably mountable on the tool to extend transversely thereof from either one or the other of the opposite sides of the tool to thereby accommodate either a left-handed or right-handed user, the method further comprising a preliminary step of mounting the removable handle on the tool to extend from a selected side of the tool so as to accommodate the handedness of the user.

In accordance with another method aspect of the present invention, there is provided a method of installing a retaining pin into aligned holes of a first object and a second object in order to secure the objects together by the pin. The installation of the retaining pin is accomplished by utilizing a tool as described above. The method comprises the following steps. The retaining pin is partially inserted into the aligned holes leaving a portion of the retaining pin protruding from the aligned holes. The removable handle is mounted on the tool to accommodate the handedness of the user and the user then grips the handle of the tool with one hand. The tip of the drive shaft of the tool is aligned with the protruding end of the retaining pin. The user may then strike the anvil plate with a hammer held in the user's other hand one or more times as required to drive the retaining pin into the aligned holes sufficiently to secure the two objects together.

In one method aspect of the invention, the retaining pin is a flex pin and the method includes the step of placing one end of an adaptor sleeve over the drive shaft and placing one end of the flex pin in the other end of the adaptor sleeve to carry out the step of starting the flex pin into the aligned holes.

BRIEF DESCRIPTION OF THE DRAWINGS

FIG. 9A is a cross-sectional view of a shank and cap showing the alignment of the holes thereof and the use of a pin having a channel thereabout for securing the cap to the shank;

FIG. 9B is a cross-sectional view of the assembled shank and cap of FIG. 9A with the tool of FIG. 4 situated for removal of the retaining pin.

DETAILED DESCRIPTION OF THE INVENTION AND PREFERRED EMBODIMENTS THEREOF

Figure 1:
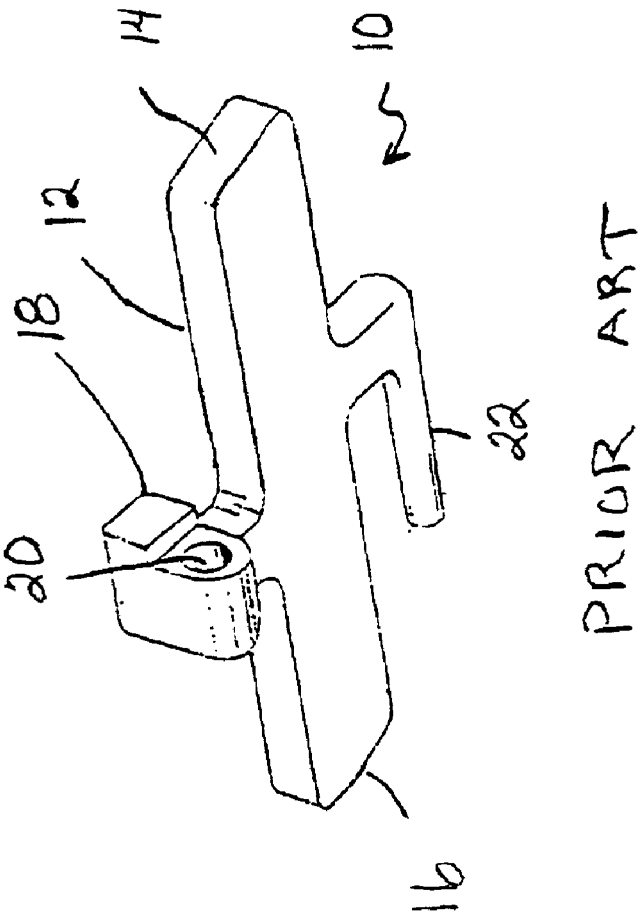
FIG. 1 illustrates by perspective view a prior art tool.

Before describing certain embodiments of the present invention, it is useful to consider the prior art tool 10 of the aforementioned U.S. Pat. No. 5,058,257 ("the '257 patent"), which is illustrated in FIG. 1 of the present application. The tool 10 includes a body member 12, a front impact face 14, a rear impact face 16, a holder block 18, in which is formed a socket 20, and an extractor pin 22. The tool 10 is used to remove a pin by manually aligning extractor pin 22 (FIG. 1) with the pin to be removed and striking front impact face 14 with a sledge hammer. The tool 10 is used to insert a pin placed within socket 20 by reversing the tool to manually align the pin held in socket 20 with the pin-receiving bore of the shank and striking rear impact face 16 with the sledge hammer. One typical use of such a device is the removal or installation of pins that hold caps on the shanks of earth-moving equipment, such as a digging bucket. The combination of a cap mounted on the shank provides a tooth of the bucket or other item of equipment.

Figure 2:
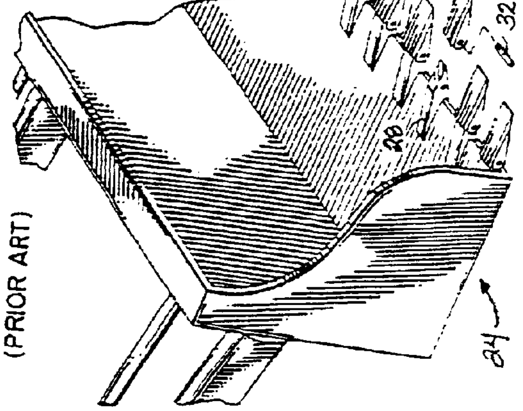
FIG. 2 (PRIOR ART)
FIG. 2 is a perspective view of the use environment of the tool of the present invention comprising a bucket with teeth thereon, the teeth comprising caps fitted over shanks.

FIG. 2 is a perspective view of a bucket 24, which is a typical use environment of the tool of the present invention. The bucket 24 has a front edge 24*a*, from which outwardly extends a plurality of shanks 28. The shanks 28 are welded to the bucket 24 and a respective cap 30 is disposed over each shank 28 and is secured thereto by a retaining pin 32. Retaining pin 32 may optionally be a flex pin as shown in FIG. 3.

In digging with the bucket 24, the caps 30 become worn and they are replaced as they are worn. The use of the removable caps 30 prevents the shanks 28 from wearing out. The shank 28, if broken or badly worn, must be removed by cutting it off the front edge 24*a* and welding a new one on. This may weaken the point of attachment.

Figure 3:
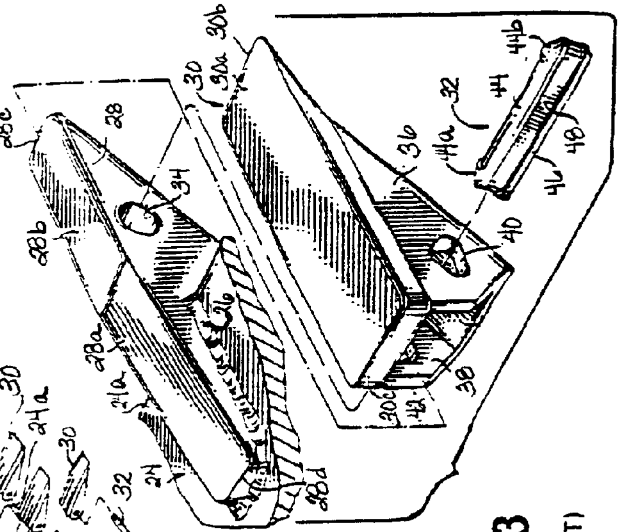
FIG. 3 (PRIOR ART)
FIG. 3 is a partial, exploded view, enlarged relative to FIG. 2, showing a shank of the bucket of FIG. 2, a cap for attachment over the shank, and a retaining pin.

In FIG. 3 the shank 28 is shown appropriately secured to the bucket 24 by a weld bead 26. As best shown in FIG. 3, the shank 28 is of a generally triangular configuration, with a rear top portion 28*a*, which is generally flat, and a front top face portion 28*b*, which is also flat. There is a slight angle between the top portions 28*a* and 28*b*.

The front top face portion 28*b* extends to a front edge 28*c*. Extending downwardly and rearwardly from the front edge 28*c* is a generally flat bottom surface, not directly shown. As is understood, although not explicitly shown, the shank 28 includes a slot (not shown) extending inwardly from a rear edge 28*d*, which is at the rear portion of the top. The rear edge 28*d* is at the back part or portion of the rear top portion 28*a*. The slot, not shown, receives the front edge 24*a* of the bucket 24. The weld bead 26 covers the slot on the top and bottom of the bucket 24 to secure the shank 28 to the bucket 24. Extending laterally or transversely through the shank 28 is a hole 34. The hole 34 receives the retaining pin 32 to secure the cap 30 to the shank 28.

As seen in FIG. 3, the cap 30 is shown spaced apart from the shank 28. The cap 30 obviously conforms to the general outer configuration of the shank 28 but sufficient space exists therebetween to allow for ease of installation when new.

The cap 30 is hollow and is of a generally triangular configuration, with plates which conform to, and thus receive, the shank 28. The cap 30 includes a top surface 30*a* which includes a front edge 30*b* and a rear edge 30*c*. The front edge 30*b* is relatively "sharp" in that it represents the front or digging edge of the bucket 24.

Extending generally downwardly from the bottom of the top surface 30*a* are side plates 36 and 38. The side plates 36, 38 are of a generally triangular configuration to, as indicated above, conform to the generally triangular configuration of the shank 28. The side plate 36 includes a hole 40 extending through it, and the side plate 38 includes a hole 42 extending through it. The holes 34, 40 and 42 are in alignment when the cap 30 is properly installed on the shank 28. The three aligned holes 34, 40 and 42 are also generally parallel to the surface top of the top surface 30*a*.

The retaining pin 32 is also shown in FIG. 3, spaced apart, but aligned with the holes 40 and 42. The retaining pin 32 is made in three portions, including a pair of spaced apart plates 44 and 46 and a rubber or elastomeric center portion 48. The top plate 44 includes upwardly extending ends 44*a*, 44*b*. The ends 44*a* and 44*b* are at the opposite ends of the top plate 44. The ends 44*a* and 44*b* are tapered so as to extend or fit relatively easily through the aligned holes 34, 40 and 42 with sufficient force. The bottom plate 46 is generally smooth or flat for its full extent or length. The length of the retaining pin 32 between the ends 44*a* and 44*b* is about the width of the cap 30 between the outside faces of the side plates 36 and 38. (As described below, the tool of the present invention is usable with both flex pins and solid steel pins.)

The rubber center portion 48 allows the retaining pin 32 to be compressed so that it fits through the aligned holes 34, 40 and 42. Then, when the end 44*a*, as shown in FIG. 3, extends outwardly from the hole 42, the retaining pin 32 expands to its full height and is locked to the cap 30 and the shank 28 to secure the two elements together.

When removing pins with the prior art tool 10, there is no handle provided to grasp the tool except for the holder block 18, which is subject to severe shock vibration when the tool 10 is struck by a sledge hammer. The sharp edges on this block may cut the user's gripping hand as the user pounds the front impact face 14 with a sledge or other heavy duty hammer, which will cause the user to hit with less force. Further, a gripping hand holding the holder block 18 may be hit accidentally by the hammer because the gripping hand is in line with the swing of the hammer, the gripping hand may also be hit because the hammer may ricochet into the gripping hand, especially if there are damaged surfaces on the hammer and/or the front impact face 14. To install the retaining pin 32 of FIG. 3, the retaining pin 32 is placed into the socket 20 (FIG. 1) and the extractor pin 22 then becomes the only "handle" available to the user. When striking the rear impact face 16, the pin 22 will move in the vertical plane and will transmit vibrations to the user's gripping hand. As seen in FIG. 1, the tool 10 has a "handedness" or directionality; that is, if a user wishes to use the same hand to wield the hammer and also wishes to avoid straddling the pin to be inserted or removed, the user must stand on one side of the shanks 28 to insert the pins 32 and on the other side of the shanks 28 (e.g., inside the bucket 24) to remove them. That is not always feasible, e.g., when replacing the teeth on a bulldozer blade. In the case where the tool is of the wrong "handedness", the user has two options: (1) to straddle the tool 10 by holding it in alignment between the legs while striking the front 14 or rear 16 impact face, or (2) to move to the opposite side of the shanks 28 (not always feasible). As seen in FIG. 2, a left-handed person could stand in front of the bucket 24 to insert the pins 32, but a right-handed person would have to stand in the bucket 24 to do so. The reverse is true when removing the pins 32. In the first option, the swing occurs in a direction into the leg area and when swinging a sledge hammer with full force, it is difficult, if not impossible, to stop a ricochet. Further, the narrow front impact face 14 of the body member 12 will greatly increase the risk of the hammer bouncing thereoff into the gripping hand and/or other close body parts, like the feet. After repeated hits, the face 14 is no longer flat but peened, which increases the danger of a ricochet.

Figure 4:
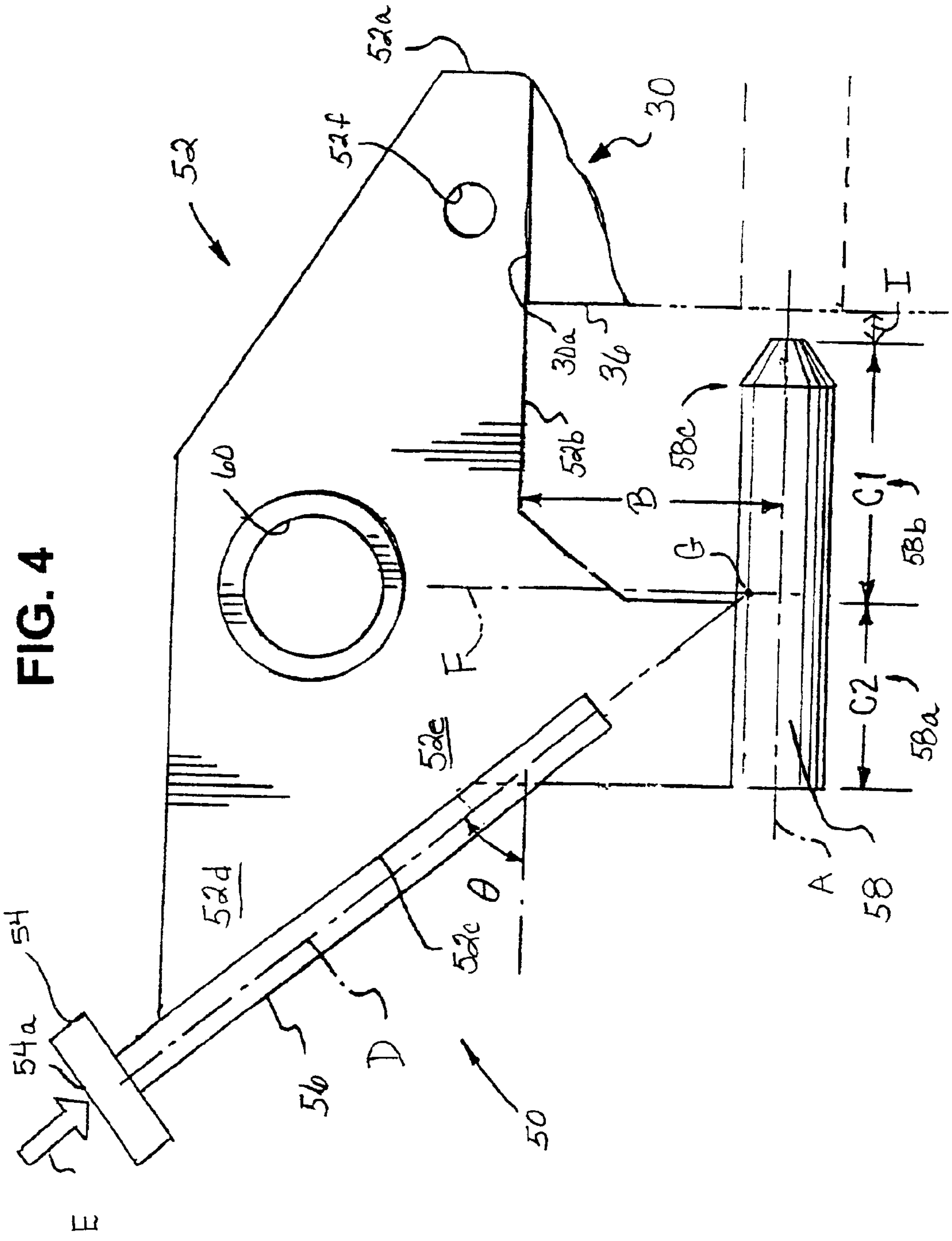
FIG. 4 is a side elevation view of one embodiment of a tool according to the present invention.
Figure 4A:
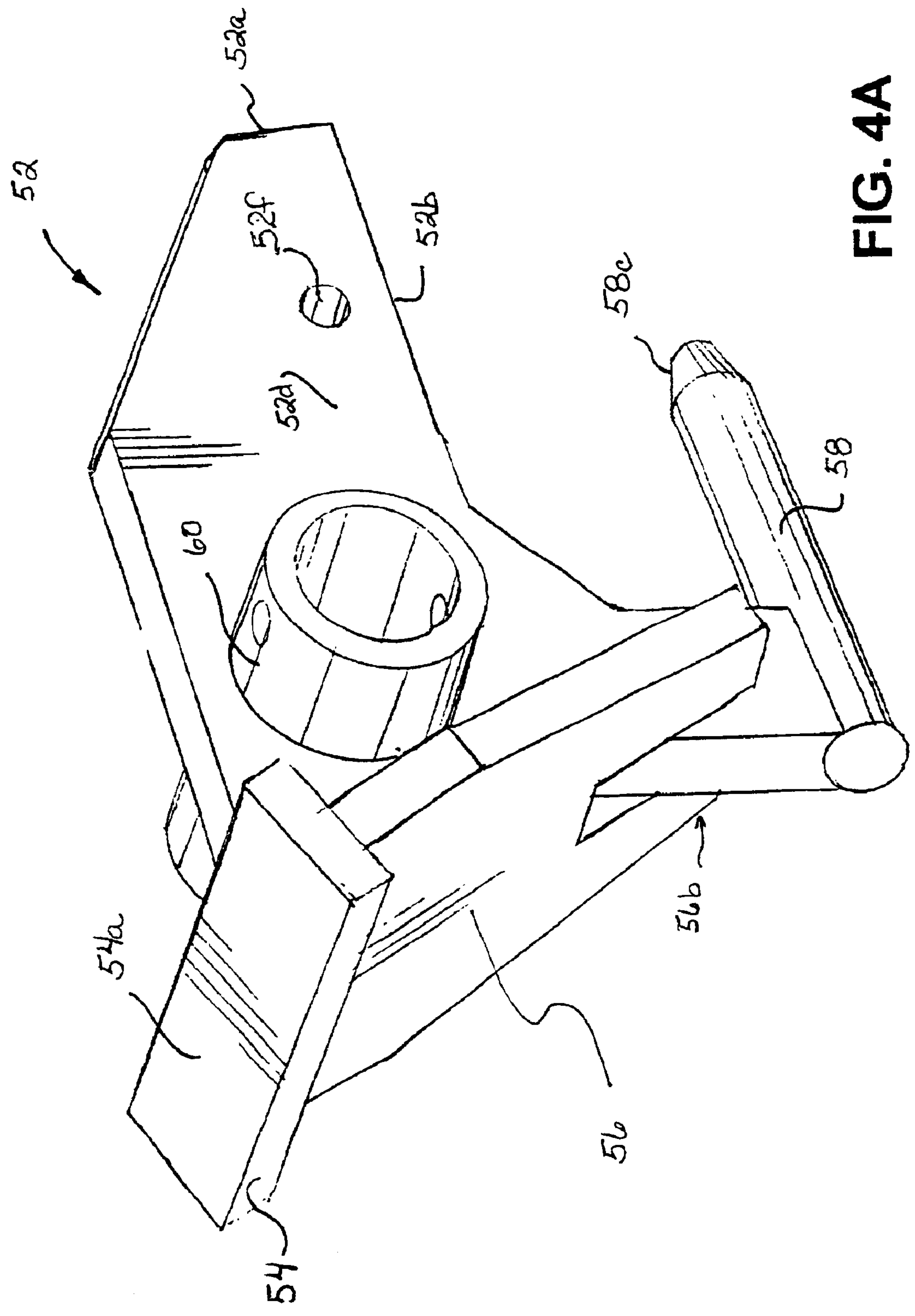
FIG. 4A is a perspective view of the tool of FIG. 4.
Figure 5:
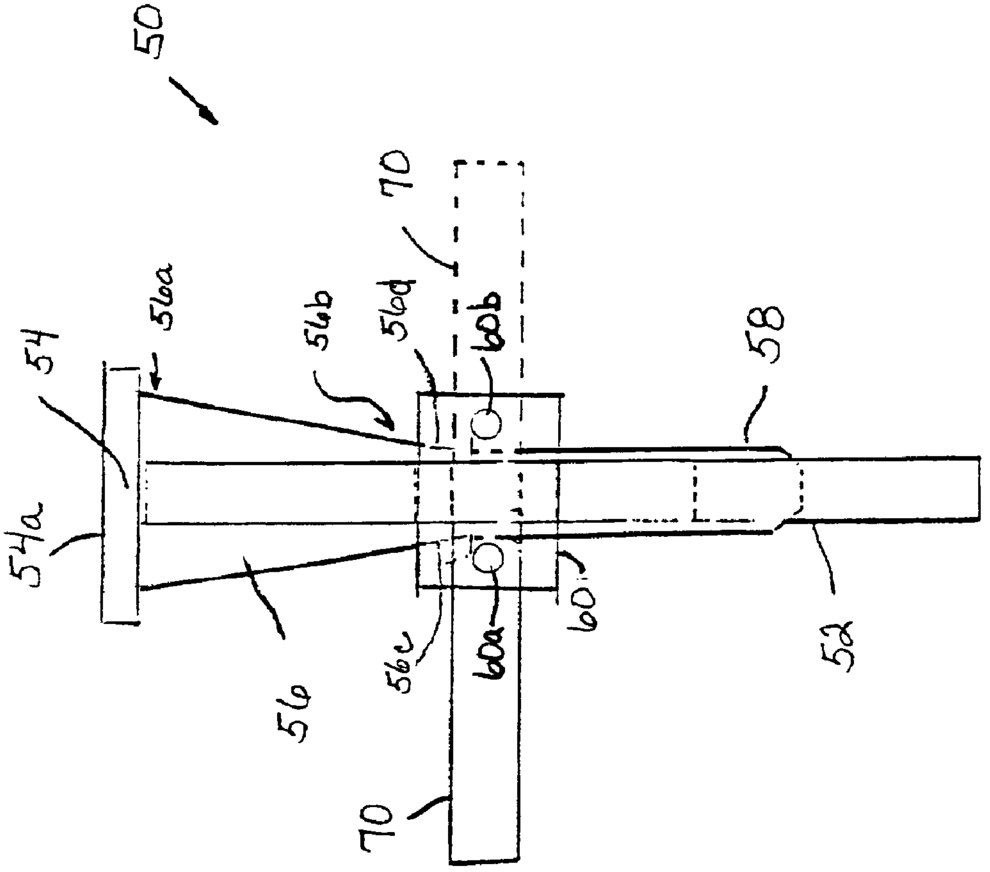
FIG. 5 is a top view of the embodiment of FIG. 4.

FIGS. 4 and 4A illustrate an embodiment of a pin removal and placement tool 50 according to one embodiment of the present invention, positioned for use on a bucket tooth cap 30. The tool 50 is composed of a body member 52 on which an anvil plate 54 is disposed. In this embodiment, the anvil plate 54 is attached to a striking plate 56 on the rear of body member 52, and provides a sole flat striking surface 54*a*. In other embodiments the anvil plate 54 might be secured directly to the body member 52 or eliminated altogether. In the latter case, a sole striking surface equivalent to striking surface 54*a* could be supplied, for example, by the edge of striking plate 56 to which, in FIG. 4, anvil plate 54 is attached. Generally, any properly positioned and configured surface on tool 50 may serve as the striking surface. In FIGS. 4A and 5 it can be seen that striking plate 56 has a tapered configuration that narrows down from a base 56*a* (FIG. 5), to which anvil plate 54 is attached, to a narrow end 54*b* that terminates near drive shaft 58. Tool 50 further comprises a drive shaft 58 on body member 52 for driving retaining pins 32, a handle mounting fixture, such as sleeve 60, for receiving a handle, and an optional front projecting portion 52*a* having a contact edge 52*b* located thereon. The body member 52 may be a steel plate of approximately one-half inch thickness. Drive shaft 58 has a proximal end 58*a* that is welded to body member 52 or the drive shaft 58 may be made as an integral part thereof, e.g., by forging. The drive shaft 58 has a distal end 58*b* which terminates at a tip 58*c*.

The working length of the drive shaft 58 is noted as "C1" (FIG. 4) and the distance from a longitudinal axis A of the drive shaft 58 to the contact edge 52*b* is noted as "B". Distance B is slightly greater than the distance from the top surface 30*a* to the center line of the holes 40, 42 (FIG. 3) in cap 30. Tool 50 is configured so that contact edge 52*b* can rest crosswise on the top surface of cap 30 with drive shaft 58 aligned with the holes 40, 42 (FIG. 3) where the retaining pin 32 for the cap 30 is situated.

Anvil plate 54 comprises a plate of steel that is secured to body member 52 by welding, and is made of T-1 alloy steel or a similar material. Anvil plate 54 provides a striking surface 54*a* that is flat and wider than body member 52 and that is disposed so that a striking axis D (FIG. 4) can be drawn perpendicularly therethrough to define an acute angle $\theta$ relative to the longitudinal axis of drive shaft 58, preferably an angle $\theta$ of approximately 40 to 70 degrees, more preferably about 45 degrees. An arrow E shows the direction of movement at impact of a hammer that is going to strike the surface 54*a*, i.e., a right angle thereto, and is parallel to or coincident with striking axis D.

The illustrated embodiment is configured so that body member 52 defines straight, rear edge 52*c* that also defines an acute angle, optionally the angle $\theta$, relative to the axis of drive shaft 58. A striking plate 56 is secured to body member 52 along edge 52*c* to reinforce body member 52 in the transmission of the force of hammer blows on anvil plate 54 to drive shaft 58. A line drawn along the rear edge 52*c* intersects with a vertical line F from the center of sleeve 60 at intersection position G proximal to the longitudinal axis A through the drive shaft 58. The body member 52 has an upper rear portion 52*d* and a lower rear portion 52*e* adjacent to the rear edge 52*c*.

Figure 4B:
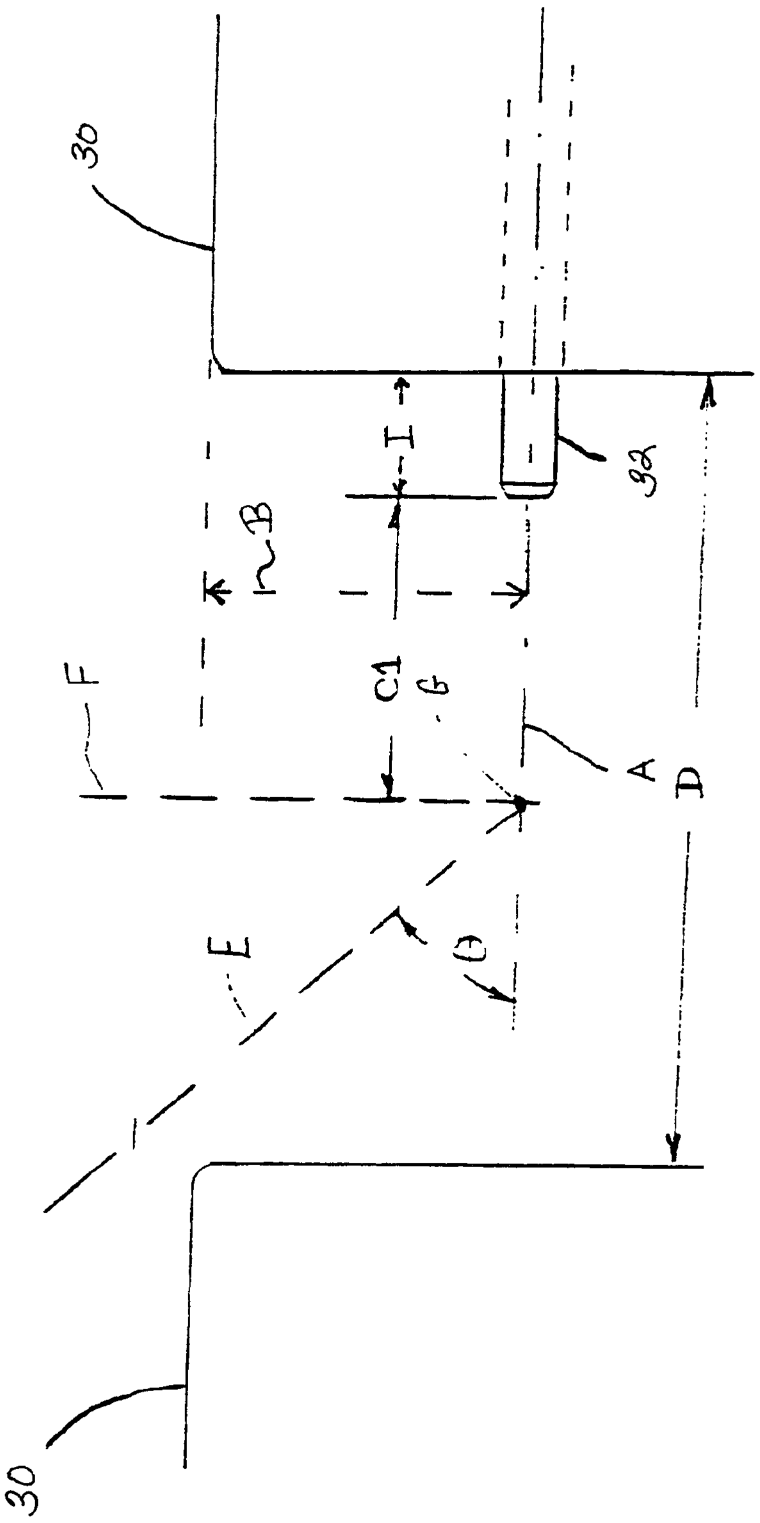
FIG. 4B schematically illustrates the angle at which the tool of the present invention is struck for efficient installation and removal of pins.

Referring to FIG. 4B, two adjacent caps 30 are partially shown separated by a distance D. A retaining pin 32 is shown partially inserted in one cap 30 and extending an expected distance I from the cap. When a properly sized tool according to this invention, e.g., tool 50 (FIG. 4) is positioned between caps 30, its drive shaft 58 can be aligned with retaining pin 32 (FIG. 4B) along axis A with the tip 58*c* of the drive shaft 58 (not shown) placed in contact with retaining pin 32. In such a position, FIG. 4B shows the striking angle $\theta$ that would be provided by the tool 50 (not shown) between the striking axis E and the pin axis A, which intersect at the position G. The vertical line F from the handle mounting fixture (not shown) also intersects at position G or very closely thereto. The longitudinal striking axis E is preferably situated within the striking plate 56 (FIG. 4) or along rear edge 52*c*. If the striking angle $\theta$ exceeds 45°, the amount of force directed along longitudinal axis A decreases, but if the angle θ decreases to about 20°, for example, the width of the tool 50 would increase and thus would not fit between caps 30 that are closer together and, further, it is more difficult to strike an almost horizontal striking surface 54*a*. Therefore, in order to have the tool 50 useable on different size buckets 24, the angle θ is preferably about 45°±5°. The total length of drive shaft 58, which is the sum of distances C1 and C2 (FIGS. 4 and 4D), should be equal to or slightly less than D (FIG. 4B) minus I (FIGS. 4 and 4B). Dimension D is the distance between adjacent cap side plates 36 (FIG. 3). Dimension I is the clearance between tip 58*c* of drive shaft 58 and cap side plate 36 (FIG. 3) when tool 50 is properly positioned between adjacent caps 30 (FIG. 4B) to insert or remove a retainer pin 32 from a cap 30. Dimension I is seen to accommodate the length of the protruding portion of a retainer pin 32 which has been positioned by hand in the hole in cap 30 for insertion by use of tool 50. The dimension C1 plus C2 is dependent on the tool model. The dimension C2 is long enough to provide for secure attachment of the drive shaft 58 to body member 52 by suitable means such as by welding. For example, the dimension C2 may be approximately two inches. The dimension C1 must be long enough to drive the pin 32 from the cap 30 or other device anchored by pin 32, and so, like dimension C2, dimension C1 will depend on the tool model usable on a particular size of equipment. For example, the dimension C1 may be about three inches. Once the retaining pin 32 is driven from the shank 28, one additional hit is normally required to drive the retaining pin 32 from the cap 30/shank 28 combination.

Figure 4C:
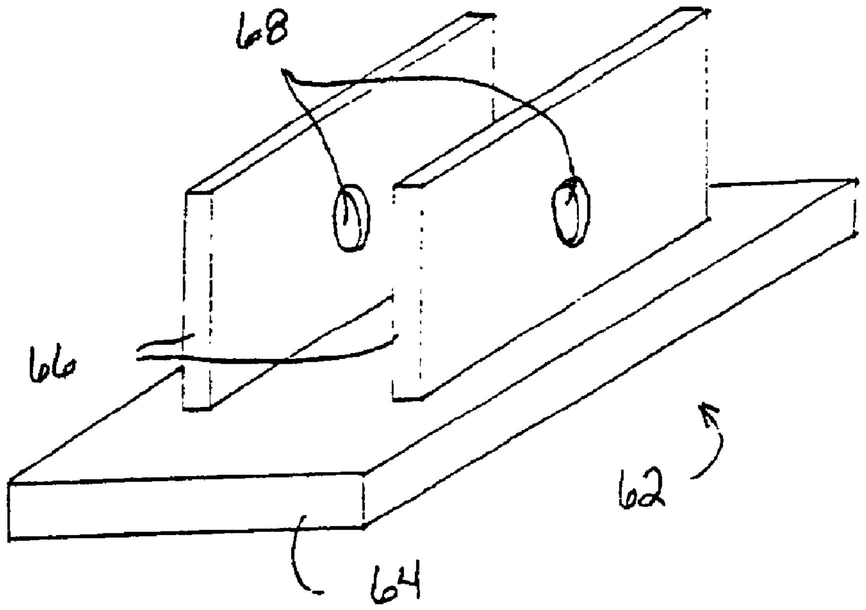
FIG. 4C is a perspective view of a shoe for use with the tool of FIG. 4.

It is advantageous to be able to use tool 50 by resting contact edge 52*b* on top of the cap 30 to be removed while aligning drive shaft 58 with the holes 34, 40 and 42 in the cap 30. For this reason, it is preferable for body member 52 to define the front projecting portion 52*a* so that contact edge 52*b* extends beyond drive shaft 58. In such embodiments, the offset B (FIG. 4) from drive shaft 58 to contact edge 52*b* should match the distance from the hole in the cap 30 to the top surface 30*a* of the cap 30. It would also be advantageous to be able to use tool 50 with caps 30 having various heights from their top surfaces 30*a* to the center of their retaining pins 32, which would require various offsets from edge 52*b* to the center of drive shaft 58. Offset B may be effectively reduced as needed by securing a shoe 62 (FIG. 4C) against edge 52*b*. Shoe 62 comprises a shim plate 64 and two uprights 66 spaced to receive body member 52 between them. Uprights 66 have holes 68 therein for alignment with hole 52*f* (FIG. 4) in body member 52 to permit shoe 62 to be secured to tool 50 by a locking pin, bolt, etc., that extends through holes 52*f* and 68. Shoe 62 is preferably configured so that when it is mounted on tool 50, edge 52*b* rests on shim plate 64, a new offset B' (FIG. 4D) is established which differs from the original offset B a distance equal to the thickness t (FIG. 4D) of shim plate 64. Optionally, a variety of shoes 62, each having a shim plate 64 of different thickness, may be provided with tool 50 so that the tool 50 may be used on a wide variety of tooth caps 30.

Figure 4D:
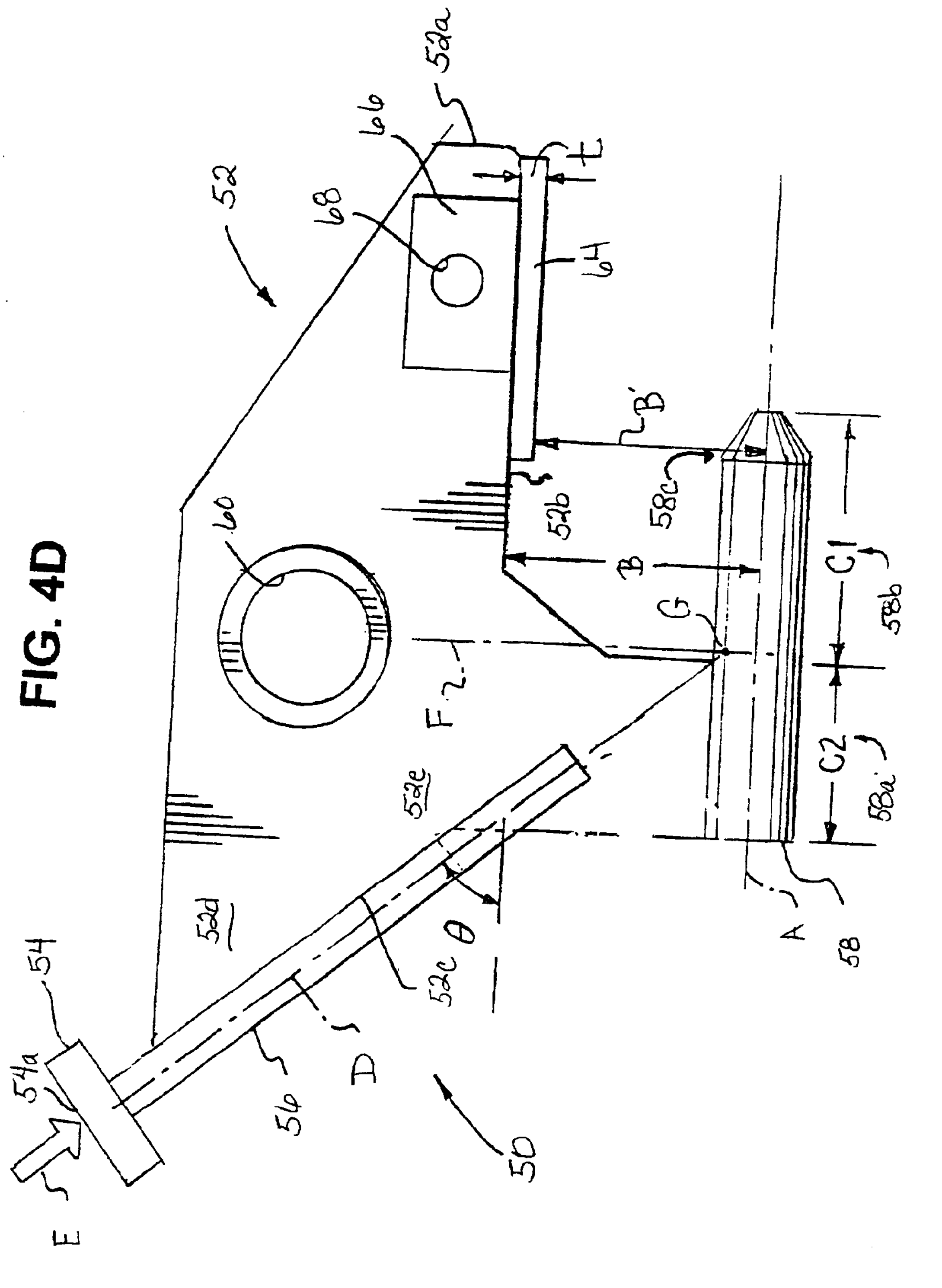
FIG. 4D is a side elevation view of the tool of FIG. 4 with the shoe of FIG. 4C thereon.

Referring to FIG. 5, the tool 50 is shown in top view which shows, in particular, the striking plate 56 attached to the body member 52 and anvil plate 54 on striking plate 56. The striking plate 56 forms a pair of legs 56*c*, 56*d* and a slot (unnumbered) between them for receiving the body member 52 therein to facilitate welding the striking plate 56 to the body member 52. The weld may include a point on body member 52 near where drive shaft 58 is joined to body member 52 to insure that a maximum force from the hammer blows is applied at a point near the position G (FIGS. 4, 4B and 4D). In an alternative embodiment, the anvil plate 54 and striking plate 56 may be formed as an integral part of the body member 52 in a conventional casting process, and have a width greater than the width of the steel plate of the body member 52 to provide a more secure striking area.

Sleeve 60 is seen in FIG. 5 to extend through body member 52 at right angles thereto, and to have locking holes 60*a*, 606*b* therein. Sleeve 60 is configured to receive therein the end of a handle 70 that has locking holes (unnumbered) therein that align with holes 60*a* and/or 60*b* to permit the handle 70 to be secured in sleeve 60 by locking pin, retainer bolts, etc., positioned in the holes. The handle 70 can be secured in sleeve 60 so that it extends to either the left or right side (as shown in dotted outline) of the tool 50 to accommodate left-handed or right-handed usage. In an alternative embodiment, handle 70 may include holes at an intermediate location thereon so that both ends of handle 70 extend from body member 52, but in opposite directions. In another alternative embodiment, a handle 70 can be permanently affixed to body member 52, e.g., by welding, and may extend to one or both sides of the tool 50. If the handle extends from only one side of the tool 50, differently configured tools 50 would be required for different handed people.

The handle 70 is shown in FIG. 5 as a bar that is mounted perpendicular to the body member 52. As seen in FIG. 5, by gripping the end of handle 70, the user's hand is in a position offset from the direction of the swing upon the striking surface 54*a* of the anvil plate 54 thereon.

In alternative embodiments, the handle mounting fixture may define a rectangular hole, a keyed hole, or a threaded hole, or any other suitable coupling, and the handle may be configured correspondingly.

Figure 6A:
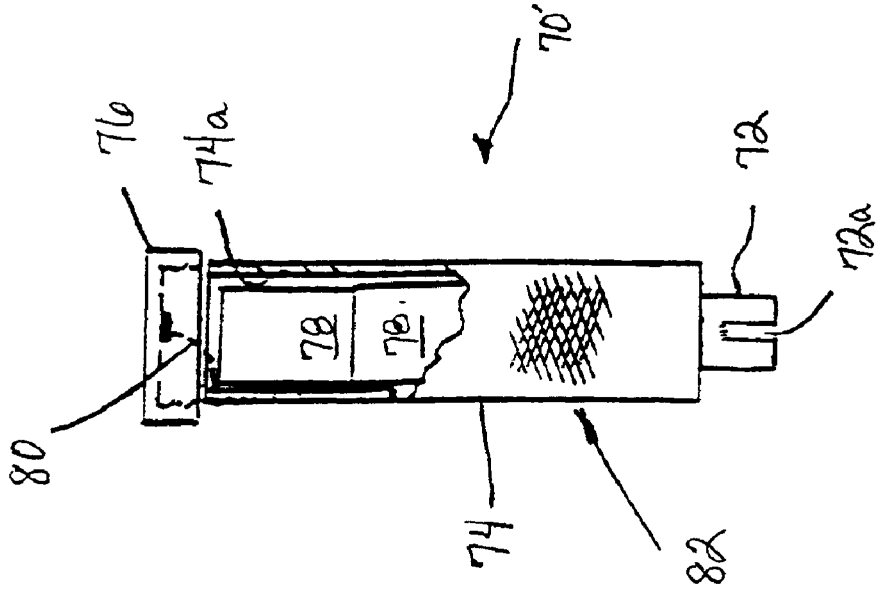
FIG. 6A is a partial cross-sectional view of one embodiment of a handle having a storage compartment therein and usable as part of the tool of the present invention.

Referring to FIG. 6A, a single handle 70' is shown which may be either the left handle bar or a right handle bar and is mounted on the body member 52 of a tool 50 according to this invention by an insert 72 having a keyway 72*a*. The single handle 70' may be a solid steel tube, for example, tube 74, or may be hollow therein to form a storage area 74*a* having a screw-on cap 76 into which at least one adaptor sleeve 78 may be placed with a securing strap 80. Further, the amount of vibration transferred to the gripping hand is greatly reduced in that the striking force on the anvil plate 54 is perpendicular to the single handle 70' and the motion imparted to the body member 52 is circular about the single handle 70'. In order to insure better control, knurling 82 may be placed on the tube 74.

Figure 6C:
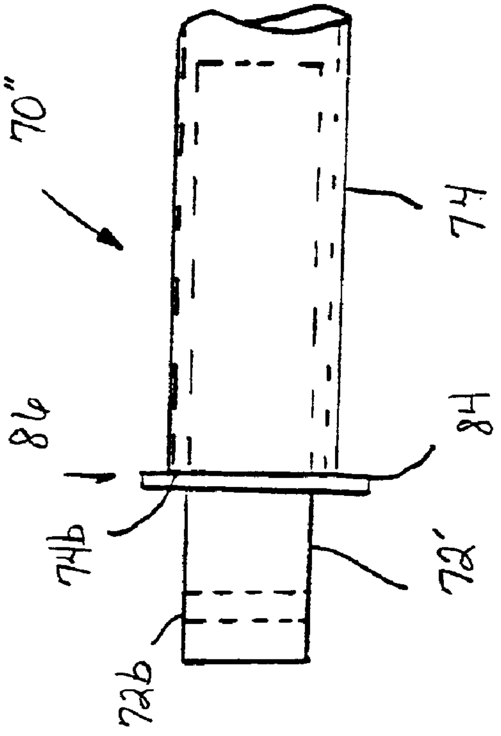
FIG. 6C is a side view of the tool of FIG. 6B.
Figure 6B:
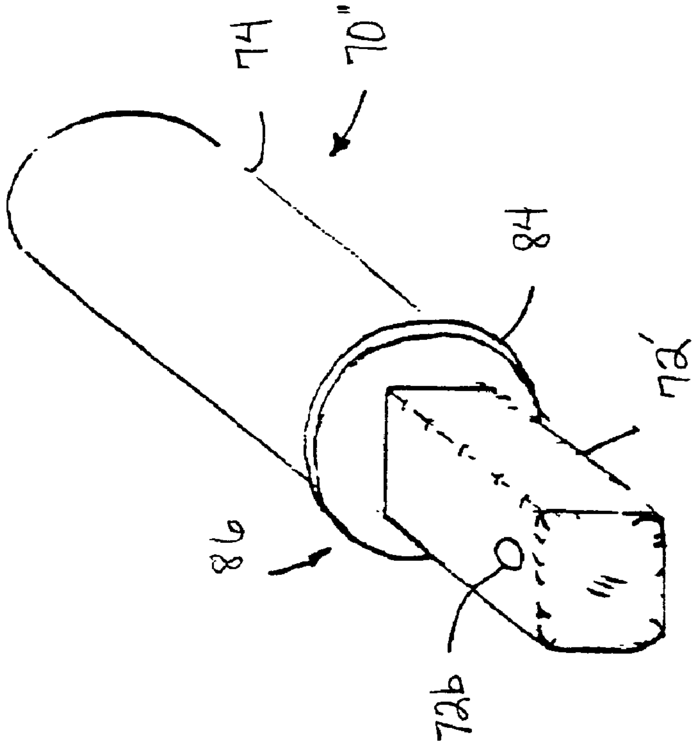
FIG. 6B is a perspective view of another embodiment of a handle usable as part of the tool of the present invention.
Figure 7B:
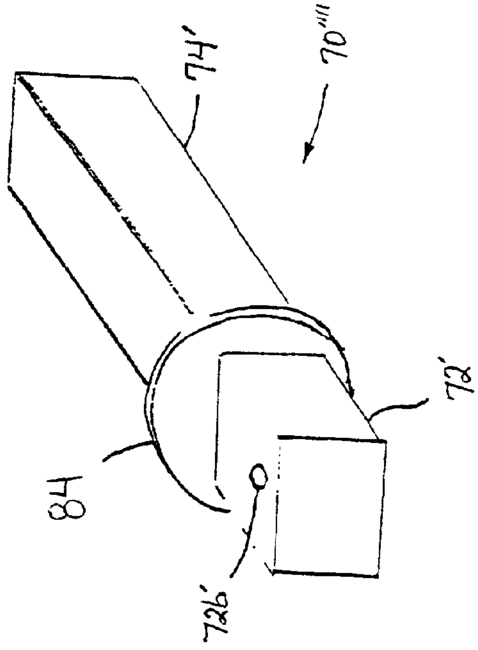
FIG. 7B is a perspective view of yet another embodiment of a handle usable with the tool of the present invention.

FIG. 6B illustrates another embodiment of a single handle 70" which has a square tube insert 72' welded, for example, into the hollow tube 74. For this handle 70", sleeve 60 (FIG. 4) would be replaced by a square sleeve. A stop flange 84 (FIG. 6B) may be placed over the insert 72' and welded onto a joint 86 between the two pieces, but the end 74*a* of the hollow tube 74*b* (FIG. 6C) may also serve as a stop to the body member 52 of the tool 50. The hole 72*b* in the insert 72 receives the hitch pin 88 shown in FIG. 7C.

Figure 7A:
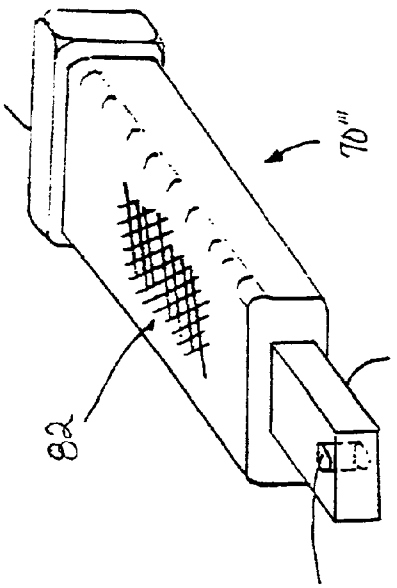
FIG. 7A is a perspective view of another embodiment of a handle usable with the tool of the present invention.
Figure 7C:
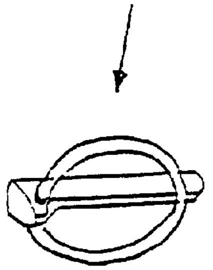
FIG. 7C illustrates a hitch pin usable for securing a metal tenon of the embodiment of FIG. 7A.

FIG. 7A shows a rectangular shaped handle 70'" with a cap 90, for example. A tenon 92 is an integral part of the handle 70" and would go into a similar shaped mortise-like sleeve 60 or hole 52*f* in the body member 52. The hitch pin 88 (FIG. 7C) goes into the hole 92*a* which would hold the handle 70'" in the body member 52. A rubber gasket could be placed around the tenon 92 to lessen the transfer of vibrations.

FIG. 7B illustrates a square tube handle 70"" being approximately 1¼ inch square. A stop flange 84 must be welded onto the tube 74' to create a insert 72' with the hole **72*b*' therein. In order to provide a better fit into a gripping hand, which has an approximately 1¼ inch square opening as formed between the thumb and fingers, the hole 52*f* in the body member 52 is rotated approximately 45 degrees. Other variations are clearly possible for the attachment of a handle 70, 70', 70", 70'", 70"". In any of these embodiments, the handle 70, 70', 70", 70'", 70""** may be at least partially hollow to provide a storage compartment therein.

Figure 8:
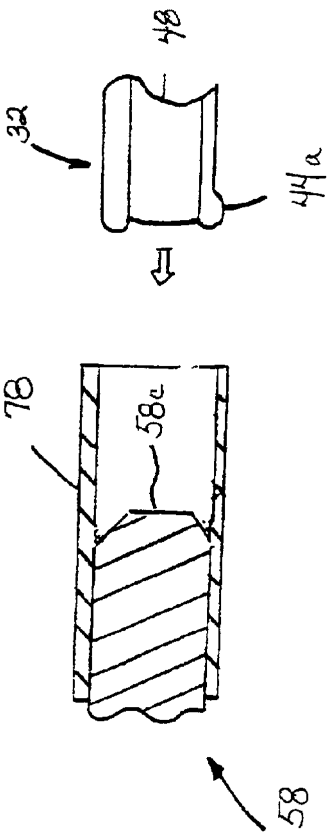
FIG. 8 is a partial, cross-sectional view of the drive shaft of the embodiment of FIG. 4 with an adaptor sleeve attached thereon.

Referring to FIG. 8, the drive shaft 58 is shown partially within an adaptor sleeve 78 with a striking end **58*c* therein. Adaptor sleeve 78 has an inside diameter slightly greater than the drive shaft 58 so that adaptor sleeve 78 may slide completely over the drive shaft 58. The retaining pin 32 is inserted into adaptor sleeve 78 and the hammer is used to hit the anvil plate 54 (FIG. 4) to drive the retaining pin 32 into a cap (not shown). During installation of a flex pin 32, the adaptor sleeve 78 serves to prevent the flex pin 32** from buckling.

Tool 50 may be used to install a retaining pin 32 (FIG. 9A), having thereabout a groove or channel **32*a* into which a retainer 94 such as a split ring clamp is placed. FIG. 9A illustrates by a vertical cross section through the cap 30 and a shank 28, the position into which the holes 34, 40, and 42, are aligned for the retaining pin 32. At one side of the shank 28 is a retainer chamber 96 for holding the retainer 94 therein. The retainer 94 is sized to engage the chamfered tip 32*b* of retaining pin 32 and is configured to expand to permit pin 32 to pass therethrough, but it will also snap into the channel 32*a* of the pin 32 to hold pin 32 in position to secure the cap 30 on the shank 28**.

In removing the retaining pin 32 from the combined cap 30 and shank 28, the drive shaft 58 is placed up the end of retaining pin 32 with contact edge **52*b* resting crosswise on top surface 30*a* of cap 30, as shown in FIG. 9B and a hammer is used in hitting the anvil plate 54 (as suggested by arrow E) to drive retaining pin 32 out of the retainer 94. This may be facilitated by providing chamfered sides for channel 32*a* or by employing an appropriately contoured retainer. Another hit may be required to remove retaining pin 32 from the shank 28, as indicated by arrow P. In order to replace retaining pin 32, the new retaining pin 32 is placed directly into the aligned holes 34, 40 with the retainer 94 installed therein. The drive shaft 58 is placed up against an end 32*c* farthest from the channel 32*a* and again the hammer hits upon the anvil plate 54 to drive the retaining pin 32 into the retainer 94**.

Figure 10:
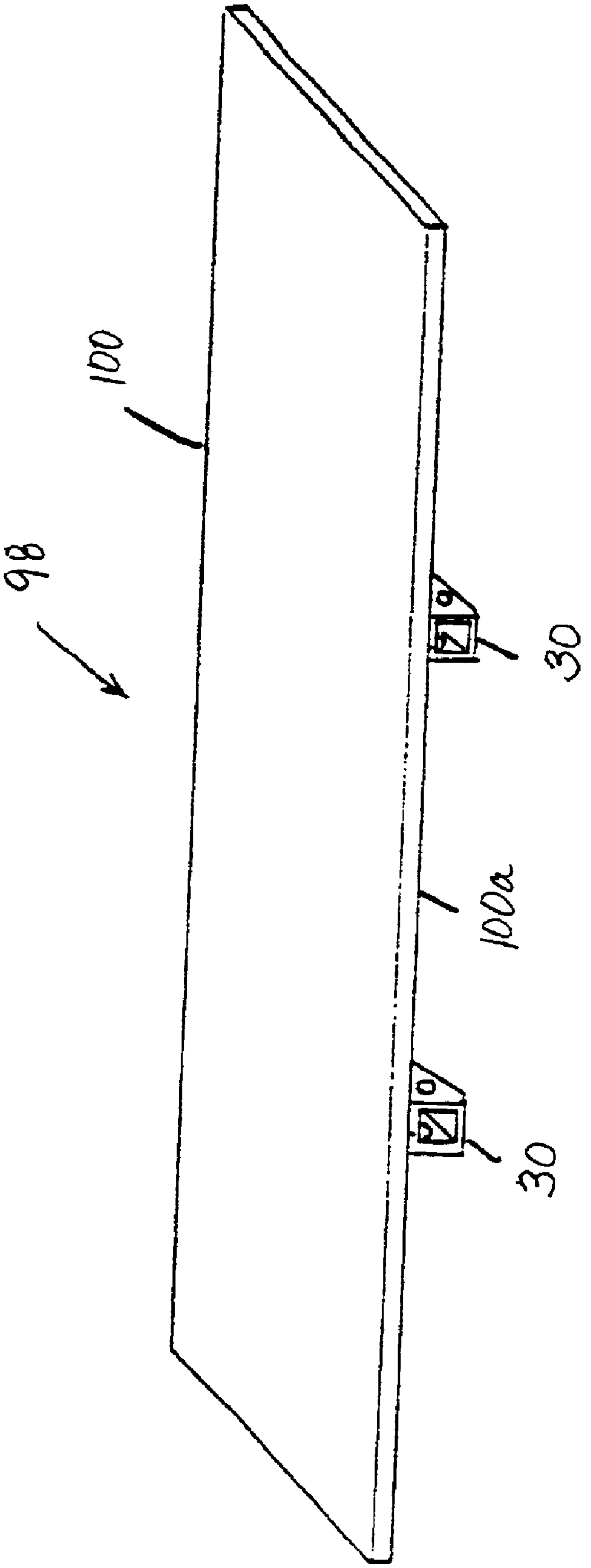
FIG. 10 is a perspective view of a grading blade having attached thereto two interior caps for use in attaching the blade to a bucket.

FIG. 10 illustrates a grading blade 98 having a metal plate 100 with two caps 30 welded to an outer edge **100*a* The caps 30 allow for the installation of grading blade 98 onto bucket 24**.

The tool 50 may be cast of metal materials such as steel to be an integral piece except for the handle assembly. The tool 50 may also be made of plate metals such as steel by welding the striking plate 56 and the drive shaft 58 to the body member 52. The metal construction must be of sufficient strength to withstand numerous blows of a sledge-like hammer thereto.

While the invention has been described with reference to particular embodiments thereof, it will be appreciated that numerous variations to the described embodiments will occur to those skilled in the art once given the present disclosure, and such embodiments are intended to be within the scope of the appended claims.

What is claimed is:

1. A pin removal and placement tool consisting essentially of:

a body member;

a drive shaft extending from the body member, the drive shaft having a longitudinal axis and a distal end which terminates at a tip;

a sole striking surface on the body member, the striking surface having a striking axis perpendicular thereto that intersects the longitudinal axis of the drive shaft at an acute angle θ, the striking surface facing away from the tip of the drive shaft whereby a blow struck against the sole striking surface will advance the drive shaft in the direction the tip is facing; and a handle on the body member, the handle extending transversely from a plane defined by the longitudinal axis of the drive shaft and the striking axis of the striking surface.

2. A tool as defined in claim 1, wherein the sole striking surface is defined by an anvil plate on the body member.

3. A tool as defined in claim 1 wherein the body member defines a contact surface that extends in a generally parallel relation to the longitudinal axis of the drive shaft.

4. A tool as defined in claim 2 wherein the body member comprises a rear edge and a striking plate fixedly mounted along the rear edge and at right angles thereto, and wherein the anvil plate is mounted on the striking plate perpendicularly thereto.

5. A tool as defined in claim 4 wherein the striking plate has a tapered configuration having a base and an opposite narrow end, the base being situated at the upper rear portion of the body member, the narrow end being situated at the lower rear portion, and wherein the anvil plate is centered on the base of the striking plate.

6. A tool as defined in claim 5 wherein the narrow end of the striking plate has two legs forming a slot between them, the slot having a width of about the thickness of the body member and an edge of the body member is received between the legs.

7. A tool as defined in claim 5 wherein the striking plate and anvil plate are integrally formed with the body member.

8. A pin removal and placement tool consistently essentially of:

a body member defining a contact edge;

a drive shaft extending from the body member, the drive shaft having a longitudinal axis and a distal end which terminates at a tip, the drive shaft extending from the body member in generally parallel relation to the contact edge with the contact edge extending beyond the tip of the drive shaft;

an anvil plate on the body member, the anvil plate defining a sole striking surface of the tool and having a striking axis perpendicular to the sole striking surface, the striking axis intersecting the longitudinal axis of the drive shaft at an acute angle θ, the striking surface facing away from the tip of the drive shaft whereby a blow struck against the striking surface will urge the drive shaft in the direction the tip is facing; and a handle on the body member, the handle extending transversely from a plane defined by the longitudinal axis of the drive shaft and the striking axis of the anvil plate.

9. A tool as defined in claim 1 or claim 8 wherein the handle is removably attached to the body member, and is dimensioned and configured to be selectively mounted on the tool to extend from one side or the other of the body member.

10. A tool as defined in claim 1 or claim 8 wherein the handle is fixedly mounted to the body member, the handle extending from both sides of the body member.

11. A pin removal and placement tool comprising:

a body member;

a drive shaft extending from the body member, the drive shaft having a longitudinal axis and a distal end which terminates at a tip;

a striking surface on the body member, the striking surface having a striking axis perpendicular thereto that intersects the longitudinal axis of the drive shaft at an acute angle θ, the striking surface facing away from the tip of the drive shaft whereby a blow struck against the striking surface will advance the drive shaft in the direction the tip is facing;

a handle on the body member, the handle extending transversely from a plane defined by the longitudinal axis of the drive shaft and the striking axis of the striking surface; and an adaptor sleeve that is dimensioned and configured to be slidably mounted on the drive shaft to extend beyond the drive shaft, and to receive a retaining pin therein.

12. A tool as defined in claim 1 or claim 8 wherein the angle θ is about 40 to 60 degrees.

13. A tool as defined in claim 12 wherein the angle θ is about 40 to 50 degrees.

14. A pin removal and placement tool comprising:

a body member:

a drive shaft extending from the body member, the drive shaft having a longitudinal axis and a distal end which terminates at a tip, and the body member defining a contact surface that extends in a generally parallel relation to the longitudinal axis of the drive shaft;

a sole striking surface on the body member, the striking surface having a striking axis perpendicular thereto that intersects the longitudinal axis of the drive shaft at an acute angle θ, the striking surface facing away from the tip of the drive shaft whereby a blow struck against the sole striking surface will advance the drive shaft in the direction the tip is facing;

a handle on the body member, the handle extending transversely from a plane defined by the longitudinal axis of the drive shaft and the striking axis of the striking surface; and the tool further comprising a shoe mounted thereon and comprising a shim plate positioned between the contact surface and the drive shaft.

15. A tool as defined in claim 14 wherein the shoe is removably secured to the body member.

16. A method of removing a retaining pin from a first object and a second object, the first object and the second object having aligned holes through which the retaining pin extends to secure the objects together, by utilizing a tool comprising a drive shaft extending from a body member, the drive shaft having a longitudinal axis and a distal end which terminates at a tip, the body member defining a contact surface that extends in a generally parallel relation to the longitudinal axis of the drive shaft to define an offset distance between the contact surface and the drive shaft, a striking surface on the body member, the striking surface having a striking axis perpendicular thereto that intersects the longitudinal axis of the drive shaft at an acute angle θ, the striking surface facing away from the tip of the drive shaft whereby a blow struck against the striking surface will urge the drive shaft in the direction the tip is facing, a handle on the body member, the handle extending transversely from a plane defined by the longitudinal axis of the drive shaft and the striking axis of the striking surface, the method comprising the steps of:

positioning a shim plate between the contact surface and the drive shaft to adjust the offset distance between the contact surface and the drive shaft;

gripping the handle of the tool with one hand of the user;

aligning the tip of the drive shaft of the tool with one end of the retaining pin; and striking the striking surface with a hammer held in the other hand of the user one or more times as required to drive the retaining pin from the aligned holes sufficiently to separate the two objects.

17. A method of installing a retaining pin into aligned holes of a first object and a second object in order to secure the objects together by the pin, by utilizing a tool comprising a drive shaft extending from a body member, the drive shaft having a longitudinal axis and a distal end which terminates at a tip, the distal end of the drive shaft being dimensioned and configured to receive and retain an adapter sleeve over the drive shaft, a striking surface on the body member, the striking surface having a striking axis perpendicular thereto that intersects the longitudinal axis of the drive shaft at an acute angle θ, the striking surface facing away from the tip of the drive shaft whereby a blow struck against the striking surface will urge the drive shaft in the direction the tip is facing, a handle on the body member, the handle extending transversely from a plane defined by the longitudinal axis of the drive shaft and the striking axis of the striking surface, the method comprising the steps of:

placing one end of the adaptor sleeve over the drive shaft and placing one end of the retaining pin in the other end of the adaptor sleeve;

partially inserting the retaining pin into the aligned holes, leaving a portion of the retaining pin protruding from the aligned holes;

gripping the handle of the tool with one hand of the user;

aligning the tip of the drive shaft of the tool with the protruding end of the retaining pin; and striking the anvil plate with a hammer held in the other hand of the user one or more times as required to drive the retaining pin into the aligned holes sufficiently to secure the two objects together.

18. A method as defined in claim 16 or claim 17 utilizing a tool wherein the handle is removably mountable on the tool to extend transversely thereof from either one or the other of the opposite sides of the tool to thereby accommodate either a left-handed or right-handed user, the method further comprising a preliminary step of:

mounting the removable handle on the tool to extend from a selected side of the tool so as to accommodate the handedness of the user.

19. A pin removal and placement tool comprising:

a body member defining a contact edge;

a drive shaft extending from the body member, the drive shaft having a longitudinal axis and a distal end which terminates at a tip, the drive shaft extending from the body member in generally parallel relation to the contact edge with the contact edge extending beyond the tip of the drive shaft;

an anvil plate on the body member, the anvil plate having a striking surface and a striking axis perpendicular to the striking surface, the striking axis intersecting the longitudinal axis of the drive shaft at an acute angle θ, the striking surface facing away from the tip of the drive shaft whereby a blow struck against the striking surface will urge the drive shaft in the direction the tip is facing;

a handle on the body member, the handle extending transversely from a plane defined by the longitudinal axis of the drive shaft and the striking axis of the anvil plate; and an adaptor sleeve that is dimensioned and configured to be slidably mounted on the drive shaft to extend beyond the drive shaft, and to receive a retaining pin therein.

20. A pin removal and placement tool comprising:

a body member;

a drive shaft extending from the body member, the drive shaft having a longitudinal axis and a distal end which terminates at a tip;

a striking surface on the body member, the striking surface having a striking axis perpendicular thereto that intersects the longitudinal axis of the drive shaft at an acute angle θ, the striking surface facing away from the tip of the drive shaft whereby a blow struck against the striking surface will advance the drive shaft in the direction the tip is facing;

a handle on the body member, the handle extending transversely from a plane defined by the longitudinal axis of the drive shaft and the striking axis of the striking surface; and a shoe mounted on the tool and comprising a shim plate positioned between the contact surface and the drive shaft.

21. The tool as defined in claim 20 wherein the shoe is removably secured to the body member.

22. A pin removal and placement tool comprising:

a body member defining a contact edge;

a drive shaft extending from the body member, the drive shaft having a longitudinal axis and a distal end which terminates at a tip, the drive shaft extending from the body member in generally parallel relation to the contact edge with the contact edge extending beyond the tip of the drive shaft;

an anvil plate on the body member, the anvil plate defining a sole striking surface of the tool and having a striking axis perpendicular to the sole striking surface, the striking axis intersecting the longitudinal axis of the drive shaft at an acute angle θ, the striking surface facing away from the tip of the drive shaft whereby a blow struck against the striking surface will urge the drive shaft in the direction the tip is facing;

a handle on the body member, the handle extending transversely from a plane defined by the longitudinal axis of the drive shaft and the striking axis of the anvil plate; and the tool further comprising a shoe mounted thereon and comprising a shim plate positioned between the contact surface and the drive shaft.

23. A new tool as defined in claim 22 wherein the shoe is removably secured to the body member.

* * * * *